US 10,138,014 B2

(12) United States Patent
Barone et al.

(10) Patent No.: US 10,138,014 B2
(45) Date of Patent: Nov. 27, 2018

(54) AUTOMATED PACKAGING LINE FOR C- AND U-SHAPED PROFILES

(71) Applicant: The Bradbury Company, Inc., Moundridge, KS (US)

(72) Inventors: Mario Ricardo Barone, Buenos Aires (AR); Francisco Ansoain, Buenos Aires (AR); Andrés Novillo, Buenos Aires (AR)

(73) Assignee: THE BRADBURY COMPANY, INC., Moundridge, KS (US)

( * ) Notice: Subject to any disclaimer, the term of this patent is extended or adjusted under 35 U.S.C. 154(b) by 0 days.

(21) Appl. No.: 15/348,584

(22) Filed: Nov. 10, 2016

(65) Prior Publication Data

US 2017/0057681 A1 Mar. 2, 2017

Related U.S. Application Data

(63) Continuation of application No. 14/591,619, filed on Jan. 7, 2015, now Pat. No. 9,511,887.

(30) Foreign Application Priority Data

May 27, 2014 (AR) .................................. P140102089

(51) Int. Cl.
*B65G 57/081* (2006.01)
*B65B 65/00* (2006.01)
(Continued)

(52) U.S. Cl.
CPC ............ *B65B 65/003* (2013.01); *B65B 27/10* (2013.01); *B65B 35/24* (2013.01); *B65B 35/50* (2013.01);
(Continued)

(58) Field of Classification Search
CPC ....... B65B 65/003; B65B 27/10; B65B 35/24; B65B 35/50; B65B 35/56; B65B 35/58; B65G 57/081; B65G 57/18
(Continued)

(56) References Cited

U.S. PATENT DOCUMENTS 2,585,697 A * 2/1952 Sommer .............. B65G 47/252
198/402
3,157,071 A * 11/1964 Pachell ................ B21B 39/004
198/410
(Continued)

FOREIGN PATENT DOCUMENTS

AU 2015203020 6/2016
CN 101249901 8/2008
(Continued)

OTHER PUBLICATIONS

IP Australia, "Patent Examination Report No. 1," issued in connection with Australian Patent Application No. 2015200118, dated Sep. 11, 2015, 5 pages.
(Continued)

*Primary Examiner* — Lynn E Schwenning
(74) *Attorney, Agent, or Firm* — Hanley, Flight & Zimmerman, LLC

(57) ABSTRACT

An automated packaging line for C- or U-shaped profiles are related methods are disclosed. An example method includes transferring a first profile and a second profile to a first location, each of the first and second profiles having a u-shaped or c-shaped cross-section defining an external convex side and an internal concave side. The example method also includes rotating a first blade and a second blade about a horizontal central axis, where the first blade and the second blade are coupled to opposite ends of a pair of rotor arms including a first rotor arm and a second rotor arm. The first and second rotor arms rotate about axes that
(Continued)

are parallel to and offset from each other. The example method also includes inserting the first profile into the first blade with the internal concave side of the first profile facing upwards as the first blade moves upward through its rotation. In addition, the example method includes rotating the second profile by engaging the first blade with the external convex side of the second profile to position the second profile with the internal concave side of the second profile facing downwards over of the internal concave side of the first profile to form a first duplex within the first blade.

17 Claims, 11 Drawing Sheets

(51) Int. Cl.
| | | |
|---|---|---|
| B65B 35/56 | (2006.01) | |
| B65B 35/24 | (2006.01) | |
| B65B 27/10 | (2006.01) | |
| B65B 35/58 | (2006.01) | |
| B65G 57/18 | (2006.01) | |
| B65B 35/50 | (2006.01) | |

(52) U.S. Cl.
CPC .............. *B65B 35/56* (2013.01); *B65B 35/58* (2013.01); *B65G 57/081* (2013.01); *B65G 57/18* (2013.01)

(58) Field of Classification Search
USPC ........................................................ 414/758
See application file for complete search history.

(56) References Cited

U.S. PATENT DOCUMENTS

| | | | |
|---|---|---|---|
| 3,308,969 | A | 3/1967 | Orms et al. |
| 3,347,397 | A | 10/1967 | Hein |
| 3,880,070 | A | 4/1975 | Kaplan |
| 3,880,273 | A | 4/1975 | Kaplan |
| 3,880,296 | A | 4/1975 | Kaplan |
| 3,920,132 | A | 11/1975 | Cleland et al. |
| 4,105,108 | A * | 8/1978 | Lauer .................. A23N 3/00 193/46 |
| 4,165,006 | A | 8/1979 | Brusa |
| 4,394,899 | A | 7/1983 | Fluck |
| 4,648,770 | A | 3/1987 | Berz et al. |
| 5,027,700 | A | 7/1991 | Tschesche |
| 5,141,388 | A | 8/1992 | Georgitsis et al. |
| 5,456,572 | A | 10/1995 | Overington |
| 5,570,995 | A | 11/1996 | Offoiach |
| 5,944,478 | A | 8/1999 | Colombo et al. |
| 6,109,862 | A | 8/2000 | Overington |
| 6,488,465 | B1 | 12/2002 | Overington |
| 7,695,240 | B2 | 4/2010 | Ghosh et al. |
| 2003/0218291 | A1 | 11/2003 | Caunter et al. |
| 2008/0199296 | A1 | 8/2008 | Ghosh et al. |
| 2009/0263231 | A1 | 10/2009 | Ghosh et al. |
| 2013/0115039 | A1* | 5/2013 | Cianci .................. B65G 43/00 414/754 |
| 2015/0183068 | A1 | 7/2015 | Barone et al. |

FOREIGN PATENT DOCUMENTS

| | | |
|---|---|---|
| DE | 1193883 | 5/1965 |
| DE | 002520592 | 11/1976 |
| DE | 2731551 | 1/1979 |
| DE | 3611156 | 12/1986 |
| DE | 4132231 | 4/1996 |
| DE | 29604813 | 2/1997 |
| DE | 102008027943 | 12/2008 |
| EP | 0196685 | 10/1986 |
| EP | 0372314 | 6/1990 |
| EP | 0819631 | 1/1998 |
| EP | 1961682 | 8/2008 |
| EP | 2889228 | 7/2015 |
| ES | 8400982 | 2/1984 |
| ES | 1003449 | 7/1988 |
| ES | 2005394 | 3/1989 |
| ES | 1037868 | 4/1998 |
| ES | 2232256 | 5/2005 |
| FR | 2866639 | 8/2005 |
| JP | 57072518 | 5/1982 |
| JP | 361178324 | 8/1986 |
| RU | 2061639 | 6/1996 |
| WO | 2008037723 | 4/2008 |

OTHER PUBLICATIONS

IP Australia, "Notice of Acceptance," issued in connection with Australian Patent Application No. 2015200118, dated Oct. 26, 2015, 2 pages.

European Patent Office, "Extended European Search Report," issued in connection with European Patent Application No. 15152692.8, dated Oct. 9, 2015, 9 pages.

Federal Service for Intellectual Property, "Decision of Grant," issued in connection with Russian Patent Application No. 2015110998, dated May 4, 2016, 20 pages.

United States Patent and Trademark Office, "Notice of Allowance and Fee(s) Due," issued in connection with U.S. Appl. No. 14/591,619, dated Jul. 29, 2016, 51 pages.

United States Patent and Trademark Office, "Non-Final Office Action," issued in connection with U.S. Appl. No. 14/591,619, dated Mar. 30, 2016, 24 pages.

United States Patent and Trademark Office, "Restriction and/or Election Requirement," issued in connection with U.S. Appl. No. 14/591,619, dated Mar. 4, 2016, 8 pages.

IP Australia, "Patent Examination Report No. 2," issued in connection with Australian Patent Application No. 2014277755, dated Feb. 10, 2016, 3 pages.

Canadian Intellectual Property Office, "Notice of Allowance," issued in connection with Canadian Patent Application No. 2,882,065 dated Jul. 21, 2016, 1 page.

Canadian Intellectual Property Office, "Office Action," issued in connection with Canadian Patent Application No. 2,874,915 dated Feb. 16, 2016, 4 pages.

Federal Service for Intellectual Property, "Official Action," issued in connection with Russian Patent Application No. 2014151754, dated Mar. 1, 2016, 10 pages.

State Intellectual Property Office of China, "Notification of the First Office Action," issued in connection with Chinese Patent Application No. 201410836751.7, dated Mar. 31, 2016, 17 pages.

European Patent Office, "Decision to Grant," issued in connection with European Patent Application No. 14199357.6, dated Aug. 25, 2016, 2 pages.

Federal Service for Intellectual Property, "Decision on Grant," issued in connection with Russian Patent Application No. 2014151754, dated Jul. 12, 2016, 17 pages.

IP Australia, "Patent Examination Report No. 1," issued in connection with Australian Patent Application No. 2014277755, dated Sep. 11, 2015, 5 pages.

European Patent Office, "European Search Report," issued in connection with European Patent Application No. 14 19 9357, dated Apr. 24, 2015, 7 pages.

IP Australia, "Notice of Acceptance," issued in connection with Australian Patent Application No. 2014277755 dated Jun. 29, 2016, 3 pages.

Mexican Industrial Property Institute, "First Examination Report," issued in connection with Mexican Patent Application No. MX/a/2014/016066, dated Jun. 20, 2017, 6 pages.

United States Patent and Trademark Office, "Notice of Allowance and Fee(s) Due," issued in connection with U.S. Appl. No. 14/566,426, dated Aug. 4, 2017, 15 pages.

Mexican Industrial Property Institute, "Notice of Allowance," issued in connection with Mexican Patent Application No. MX/a/2017/060699, dated Aug. 28 2017, 4 pages.

(56) References Cited

OTHER PUBLICATIONS

United States Patent and Trademark Office, "Non-Final Office Action," issued in connection with U.S. Appl. No. 14/566,426, dated Jun. 20, 2017, 65 pages.

Canadian Intellectual Property Office, "Notice of Allowance," issued in connection with Canadian Patent Application No. 2,874,915, dated Jun. 20, 2017, 1 page.

IP Australia, "Examination Report No. 1," issued in connection with Australian Patent Application No. 2016203019, dated Jun. 2, 2017, 2 pages.

IP Australia, "Examination Report No. 1," issued in connection with Australian Patent Application No. 2016203020, dated Jun. 2, 2017, 2 pages.

Argentine Patent Office, "Examination Report," issued in connection with Argentine Patent Application No. P14 01 02089, dated Jun. 14, 2017, 7 pages.

European Patent Office, "Decision to Grant," issued in connection with European Patent Application No. 15152692.8, dated Apr. 21, 2017, 2 pages.

Argentine Patent Office, "Examination Report," issued in connection with Argentine Patent Application No. P13 01 05065, dated Apr. 12, 2017, 8 pages.

IP Australia, "Notice of Acceptance," issued in connection with Australian Patent Application No. 2016203019, dated Jul. 6, 2017, 3 pages.

IP Australia, "Notice of Acceptance," issued in connection with Australian Patent Application No. 2016203020, dated Jul. 6 2017, 3 pages.

United States Patent and Trademark Office, "Restriction and/or Election Requirement," issued in connection with U.S. Appl. No. 14/566,426, dated Feb. 28, 2017, 8 pages.

Canadian Intellectual Property Office, "Office Action," issued in connection with Canadian Patent Application No. 2,874,915, dated Dec. 12, 2016, 4 pages.

Mexican Industrial Property Institute, "Office Action," issued in connection with Mexican Patent Application No. MX/a/2015/002579, dated Jan. 31, 2018, 5 pages.

Mexican Industrial Property Institute, "Office Action," issued in connection with Mexican Patent Application No. MX/a/2015/002579, dated Oct. 23 2017, 5 pages.

* cited by examiner

AUTOMATED PACKAGING LINE FOR C- AND U-SHAPED PROFILES

RELATED APPLICATIONS

This patent arises from a continuation of U.S. application Ser. No. 14/591,619, titled "AUTOMATED PACKAGING LINE FOR C- AND U-SHAPED PROFILES," and filed Jan. 7, 2015, which claims priority to Argentine Patent Application No. P14 01 02089, filed May 27, 2014, and titled "LINEA AUTOMATICA DE EMPAQUE PARA PERFILES DE SECCION C Y U," both of which are hereby incorporated by reference their entireties.

TECHNICAL FIELD

The present disclosure relates generally to an automated packaging line and, more particularly, to an automated packaging line for C- and U-shaped profiles or molds.

BACKGROUND

Open structural profiles or molds, such as those having a U-shaped or a C-shaped cross-section, are used in the lightweight metal construction industry, especially in structures used for industrial buildings and for agriculture use. These structural profiles are also used for housing and commercial structures (e.g., offices), which reduces costs in material and in labor. Due to the characteristics of their cross-sections, the profiles optimize the resistance-weight ratio, providing an excellent finish for visible items.

Spanish Utility Model Application ES 1003449U refers to an automated profiles packaging equipment, especially for aluminum profiles. This equipment does not include duplex packaging and, therefore, does not provide packaging space reduction. Spanish Utility Model Application ES 1037868U refers to a positioning and wrapping device for lineal profiles. The device also does not does not include duplex packaging of U- or C-shaped profiles. As a result, the packages occupy more space.

Spanish Patent ES 2005394 refers to an automated profiles packaging machine, especially for aluminum molds. This equipment does not include duplex packaging of U- or C-shaped profiles and, therefore, also does not provide the packaging space reduction.

The publication of Spanish Patent Application ES 2232256 refers to a profile stacker of the kind used for the automated grouping and transport between the manufacturing and the packaging of molds. The mold stacker does not include duplex packaging of U- or C-shaped profiles and, therefore, does not provide packaging space reduction.

The publication of Spanish Patent Application ES 8400982 A1 refers to a work procedure to form nested or not nested molded bars bundles and devices for the application of the procedure. However, this procedure is achieved through rotating magnets that take the bars and rotate them 180° to successively fit them to each other. The number of bundles to be made is limited to the amount of turning magnets.

U.S. Pat. No. 5,027,700 refers to a machine designed to make pairs of long items that have a U-shape and arrange them in pairs by piling the mentioned pairs. In the machine, a picker and an inverter work together to hold one of the items in one place and then invert the second item over the first to make the pair. The inversion of the second item over the first item is achieved by means of the conceived inverter consisting of a first rotating arm held over a pivot, under the conveyor belt with which the items are transported. An air engine moves the arm pivot so as to partially invert the second item over the first. The inverter also has a second rotating arm connected to the first that pivots near the first rotating arm to complete the inversion of the second item over the first.

International PCT Patent Publication WO2008/037723 refers to a U- or C-shaped metallic profiles packer consisting of a feeding line for the mold pieces, equipment to transfer pairs of the mentioned profile pieces through a device, equipment to assemble the mentioned pieces with their cavities opposing each other, equipment to transport the mentioned pieces along a vertical, rectangular path, equipment to support the mentioned assembled pieces, first equipment to transfer at least two pairs of assembled pieces next to each other from the mentioned supporting equipment to the piling equipment for the mentioned profile pairs, second equipment to transfer the mentioned assembled pairs of pieces piled up next to each other, equipment to join the mentioned assembled pairs of pieces piled up next to each other. To assemble the pair, the machine of WO/2008037723 requires a shifting rotor motion where the pair is picked by the blades in an ascending vertical motion, which requires a relatively higher number of parts. Additionally, the machine only uses one pair of blades, which results in a relatively slower packing or packaging speed.

Figure 1:
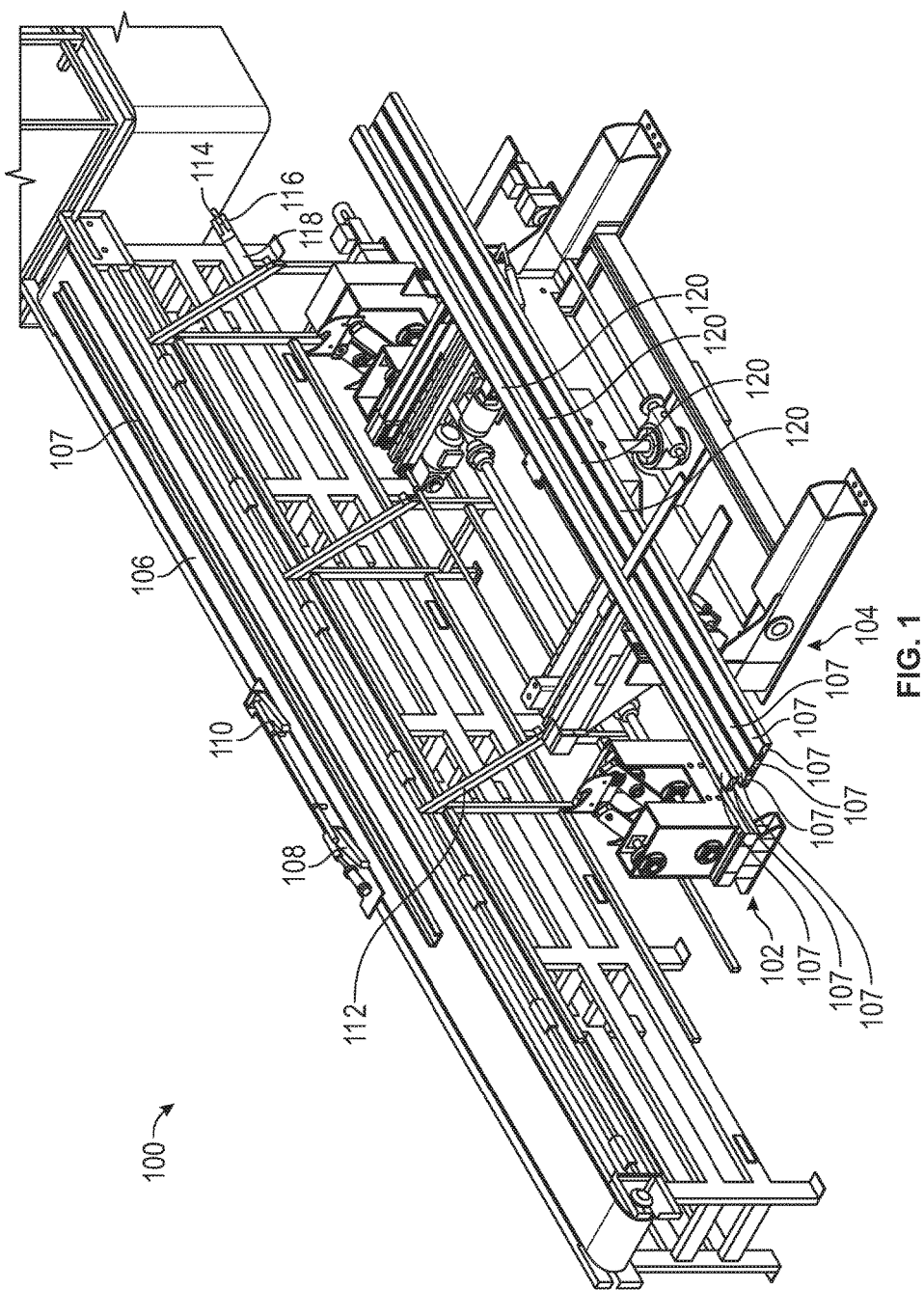
FIG. 1 illustrates a perspective view of an example automated packaging line having an example duplex assembler and an example bundle assembler in accordance with the teachings of this disclosure. A plurality of example U- or C-shaped profiles are also illustrated.

Certain examples will be better understood when read in conjunction with the provided drawings, which illustrate examples. It should be understood, however, that the examples are not limited to the arrangements and instrumentality shown in the attached drawings. Wherever possible, the same reference numbers will be used throughout the drawing(s) and accompanying written description to refer to the same or like parts. The figures are not to scale.

DETAILED DESCRIPTION

Disclosed herein is an example packaging line to automatically handle materials such as, for example, open structural molds or profiles with a U-shaped or a C-shaped section (e.g., cross-section) having an exterior side (e.g., convex side) and an interior side (e.g., a concave side, a hollow side) between two lateral flaps (e.g., side walls). The example packaging line receives the profiles from a profiler or forming machine cutter, arranges the profiles into one or more duplexes and transfers the duplex(es) to a bundle assembly table where the bundles are created and strapped. A duplex or double profile is formed by a pair of profiles, where one profile is positioned with its concave side facing downwards over another profile with its concave side facing upwards. As a result, one of the lateral flaps of each of the profiles is inserted into the concave side of the other profile. The example packaging line results in higher packaging speeds than known lines. The example packaging line also has relatively less parts than known lines.

Disclosed herein is an example automated packaging line for profiles having a U-shaped or a C-shaped section with an external convex side and an internal concave side between two lateral sides. The example automatic packaging line includes a conveyor belt located at an exit of a profiler or forming machine cutter to transport the profiles longitudinally with the concave side facing upwards, two pivoting kickers to transport the profiles in a direction that is perpendicular to the conveyor belt and an inclined plane disposed perpendicular and adjacent to the conveyor belt. The inclined plane has two stops located at an end of the inclined plane to hold the profiles. When the profiles are moved by the pivoting kickers, the profiles travel along the inclined plane via gravitational force. The example automatic packaging line includes a duplex assembler comprising of a first set of blades and a second set of blades with 180° rotating movement. The first and second sets of blades are located on respective sides of the inclined plane and next to the end of the inclined plane, and each of the first and second sets of blades have two blades coupled to rotor arms to generate the rotating motion. The blades are to take a first profile with its internal concave side facing upwards and turn the first profile upside-down to position the first profile with its internal concave side facing downwards over a second profile with its internal concave side facing upwards to form a duplex. The duplex formed when the internal concave sides of the first and second profiles oppose each other. The example automatic packaging line also includes a bundle assembler to receive one or more duplexes. The bundle assembler includes a frame having a set of retractable claws and a set of tilting claws. A duplex from the duplex assembler is to be placed over the frame. The bundle assembler has a pushing cart to transport one or more duplexes to the set of retractable claws. After a last duplex is transported over the set of retractable claws, the pushing cart is to remain in contact with the last duplex while the set of retractable claws are to retract to place the one or more duplexes over the set of tilting claws. When the one or more duplexes are arranged over the set of tilting claws, the set of tilting claws move downward such to position the one or more duplexes below the set of retractable claws, and the pushing cart moves backward and the set of retractable claws extend over the one or more duplexes. The procedure is to be repeated based on columns included in a bundle. After the bundle is completed, the set of tilting claws move downward to place the bundle over a bed to strap the bundle and send it to storage.

In some examples, the duplex assembler, with the first and second sets of blades located at both sides next to the end of the inclined plane, is to perform a 180° rotating movement in which the blades of each of the first and second set of blades are maintained in a horizontal position while the rotation is performed. In such an example, the automated packaging line includes a blades rotor system having of two parallel axles for each of the first and second sets of blades. The parallel axles are located on a same horizontal plane and each of the parallel axles has a dented pulley to transmit the rotating movement to the respective parallel axles. The rotating movement is provided via a principal axle having dented pulleys, and the dented pulleys of the principal axle are coupled via dented belts to the dented pulleys of each of the two parallel axles to rotate each of the two parallel axles.

In some examples, each of the first and second sets of blades is to perform substantially the same circular movement transferred by the principal axle while maintaining substantially the same relative position in both of the blades of each of the first and second sets of blades relative to the parallel axles of both sides after the end of the inclined plane.

In some examples, the automated packaging line includes an actuator to generate the movement of the principal axle to turn the dented pulleys of the principal axle to transfer the movement to the rotor arms through the dented pulleys of each of the parallel axles.

In some examples, the rotor arm rotation is to enable the two blades of each of the first and second sets of blades to perform a circular movement during which, upon ascending, the blades contact the end of the inclined plane to obtain two of profiles located at the end of the inclined plane to oppose the internal concave sides of the profiles making the duplex and to place the duplex over the frame located above the bundles assembler.

In some examples, after a duplex is placed over the frame, the blades attached to the opposite ends of the rotor arms obtain two profiles placed at the end of the inclined plane at the location where the profiles forming the first duplex were previously located. The blades attached to the opposite ends of the rotor are to oppose the internal concave sides of the two profiles to make a second duplex and place the second duplex over the frame, located above the bundle assembler, in an adjacent position to the first duplex. The cycle is to be repeated based on rows to be in the bundle.

In some examples, the blades include rectangular plates with machined upper sections that generate a hollow area with an inverted (1) triangular shape with curved sides and rounded tip and (2) a narrow tip at an end of the side where the duplexes are to be assembled.

In some examples, the narrow tips of the blades, when performing the circular movement, push and elevate the first profile from a lower section of the inclined plane relatively closer to the conveyor belt than the second profile by its external convex side. The second profile is located at the lower section of the inclined plane at the position relatively closer to the bundles assembler than the first profile is moved to the interior concave area of the blades as the blades move upward to perform the circular movement. The narrow tips continue elevating the upper end of the first profile that is closer to the conveyor belt while its lower end moves towards the interior concave area of the blades at the lower section of the narrow tips where the second profile is located with its internal concave side facing upwards. The continual rise of the blades to generate the rotating motion of the first profile through this action is to assemble the duplex with the internal concave sides of both the first and second profile opposed to each other.

In some examples, the conveyor belt, the pivoting kickers, the actuator to generate the movement of the principal axle, the set of retractable claws, the set of tilting claws and the pushing cart are to be controlled via one or more Logic Programmable Controllers (LPCs) to automate electro-mechanic processes performed.

An example packaging line to pack profiles disclosed herein includes a first blade and a second blade that are rotatable around a horizontal axis in a first vertical plane and a third blade and a fourth blade that are rotatable about the horizontal axis in a second vertical plane that is parallel to and offset from the first vertical plane. The first blade and the third blade are synchronously rotatable around the horizontal axis and the second blade and the fourth blade are synchronously rotatable about the horizontal axis. The first blade and the third blade are to receive a first profile having a c-shaped cross-section or a u-shaped cross-section and the first blade and the third blade are to rotate a second profile having a c-shaped cross-section or a u-shaped cross-section over the first profile such that the first profile is positioned in a first orientation and the second profile positioned in a second orientation opposite the first orientation to form a duplex disposed in the first and third blades.

In some examples, the first blade is disposed substantially 180 degrees (°) opposite of the second blade relative to the horizontal axis, and the third blade is disposed substantially 180° opposite the fourth blade relative to the horizontal axis.

In some examples, the packaging line includes a first rotor arm having a first end and a second end. The first blade is rotatably coupled to the first end and the second blade is rotatably coupled the second end. The example packing line also includes a second rotor arm having a third end a fourth end. The first blade is rotatably coupled to the third end and the second blade is rotatably coupled to the fourth end. In some such examples, the packaging line further includes a first axle coupled to the first rotor arm to rotate the first rotor arm. The first axle is disposed perpendicular to the first rotor arm. In such an example the packaging line also includes a second axle coupled to the second rotor arm to rotate the second rotor arm. The second axle is disposed perpendicular to the second rotor arm, and the first and second axles are parallel to each other and disposed along a same horizontal plane. In some examples, when the first rotor arm and the second rotor arm rotate, the first and second blades are to remain substantially horizontal as the first and second blades rotate about the horizontal axis. In some examples, the packaging line also includes a third rotor arm having a fifth end and a sixth end. The third blade is rotatably coupled to the fifth end and the fourth blade is rotatably coupled to the sixth end. In such an example, the packaging line includes a fourth rotor arm having a seventh end and an eighth end. The third blade is rotatably coupled to the seventh end and the fourth blade is rotatably coupled to the eighth end. Further, in such an example, the packaging line includes a third axle coupled to the third rotor arm to rotate the third rotor arm and a fourth axle coupled to the fourth rotor arm to rotate the fourth rotor arm. In some examples, the first axle and the third axle are substantially aligned along a first axis and the second axle and the fourth axle are substantially aligned along a second axis. In some examples, the packaging line also includes an actuator coupled to the first, second, third and fourth axles to rotate the first, second, third and fourth axles simultaneously.

In some examples, when the first, second, third and fourth blades rotate around the horizontal axis, the first blade and the third blade are to remain along a same horizontal plane as each other and the second blade and the fourth blade are to remain along a same horizontal plane as each other. In some examples, the first blade has a first notch and the third blade has a second notch. In such an example, the duplex is to be disposed within the first notch and the second notch.

Another example packaging line to pack profiles disclosed herein includes a first blade having a first end, a second end, a first tip at the first end, a second tip at the second end and a first notch formed between the first tip and the second tip. The example packaging line also includes a second blade having a third end, a fourth end, a third tip at the third end, a fourth tip at the fourth end and a second notch formed between the third tip and the fourth tip. The example packaging line includes a first rotor arm rotatably coupled to the first end and rotatably coupled to the third end, a second rotor arm rotatably coupled to the second end and rotatably coupled to the fourth end, a first axle coupled to the first rotor arm to rotate the first rotor arm, the first axle disposed perpendicular to the first rotor arm and a second axle coupled to the second rotor arm to rotate the second rotor arm. The second axle is disposed perpendicular to the second rotor arm, the second axle is parallel to the first axle and the first and second axles are disposed along the same horizontal plane. The first and second axles are to rotate the respective first and second rotor arms to rotate the first and second blades about a central axis defined between the first and second axles. When the first blade is ascending the first blade is to receive a first profile within the first notch with a concave side of the first profile facing upwards and is to invert a second profile over the first profile using the first tip such that a concave side of the second profile is facing downwards over the first profile to form a first duplex within the first notch of the first blade.

In some examples, the first blade is disposed substantially 180° opposite of the second blade relative to the central axis. In some examples, the first and second blades remain substantially horizontal as the first and second blades rotate about the central axis. In some examples, when the second blade is rotating upwards the second blade is to receive a third profile within the second notch with a concave side of the third profile facing upwards and is to invert a fourth profile over the third profile using the third tip such that a concave side of the fourth profile is disposed downwards over the third profile to form a second duplex within the second notch.

An example method disclosed herein includes transferring a first profile and a second profile to a first location. Each of the first and second profiles have a u-shaped or c-shaped cross-section defining an external convex side and an internal concave side. The example method includes rotating a first blade and a second blade about a horizontal central axis. The first blade and the second blade are coupled to opposite ends of a pair of rotor arms, and the rotor arms rotate about axes that are parallel to and offset from each other. The example method also includes inserting the first profile into the first blade with the concave side of the first profile facing upwards as the first blade moves upward through its rotation and rotating the second profile by engaging the first blade with the external convex side of the second profile to position the second profile with the concave side of the second profile facing downwards over of the concave side of the first profile to form a first duplex within the first blade.

In some examples, the method includes transferring the first duplex to a second location to be packaged. In some examples, the method includes transferring a third profile and a fourth profile to the first location. Each of the third and fourth profiles has a u-shaped or c-shaped cross-section defining an external convex side and an internal concave side. Such an example method includes inserting the third profile into the second blade with the concave side of the third profile facing upwards as the second blade moves upward through its rotation and rotating the fourth profile by engaging the first blade with the external convex side of the fourth profile to position the fourth profile with the concave side of the fourth profile facing downwards over of the concave side of the third profile to form a second duplex within the second blade.

In some examples, transferring the first and second profiles includes sliding the first and second profiles down an inclined plane to the first location. In some examples, the method includes maintaining the first and second blades substantially horizontal as the first and second blades rotate around the central axis.

In some examples, rotating the first and second blades about the horizontal central axis includes rotating a first rotor arm and a second rotor arm. The first rotor arm has a first end rotatably coupled to the first blade and a second end rotatably coupled to the second blade, and the second rotor arm has a third end rotatably coupled to the first blade and a fourth end rotatably coupled to the second blade.

In some examples, the method includes further forming a second duplex with the second blade. The first duplex and the second duplex are to be formed in one full rotation of the first and second blades about the horizontal central axis.

Referring now to the figures, an example automated packaging line 100 is illustrated in FIG. 1. The example packaging line 100 includes a duplex assembler 102 and a bundle assembler 104. In the illustrated example, the packaging line 100 includes a conveyor belt 106 mounted at an exit or outlet of a former and/or cutter. The conveyor belt 106 receives profiles or molds 107 with a U-shaped or a C-shaped section (e.g., cross-section). The profiles 107 are transported by the conveyor belt 106 with their concave sides (e.g., internal face, hollow side) facing upward.

In the illustrated example, a first pivoting kicker 108 and a second pivoting kicker 110 move over the conveyor belt 106 in a direction that is perpendicular to the conveyor belt 106. The kickers 108, 110 take the profiles 107 from the conveyor belt 106 and place the profiles 107 over an inclined plane 112 located perpendicularly to the conveyor belt 106. The pivoting kickers 108, 110 move the profiles 107 perpendicularly (e.g., one at a time) toward the inclined plane 112, where the profiles 107 are transferred to the duplex assembler 102. In the illustrated example, the profiles 107 are moved down the inclined plane 112 via gravitational force. In other words, the weight of a profile causes the profile 107 to move (e.g., slide) down to a lowest point or end on the inclined plane 112. At the lowest point of the inclined plane 112, each profile 107 make makes contact with two stops 113, 115 located at an end of the inclined plane 112 to hold the profiles 107. In the illustrated example, the pivoting kickers 108, 110 are pneumatically powered. However, in other examples, other types of actuating devices may be employed. In some examples, only one pivoting kicker may be employed or more than two pivoting kickers may be employed. In some examples, only one stop is employed or more than two stops are employed.

In an example packaging sequence, a first profile 107 is transferred from the cutter by the conveyor belt 106 with its concave side facing upwards to an area where pivoting kickers 108, 110 are located. The pivoting kickers 108, 110 are adjacent to and/or over the conveyor belt 106 and move the first profile 107 in a direction that is perpendicular to its path along the conveyor belt 106. During the perpendicular motion, the first profile 107 slides over the inclined plane 112 until reaching the two stops 113, 115 located at each side of the lower end of the inclined plane 112. A second profile 107 follows the same path and ends up in a position adjacent to the first profile 107 at the lower end of the inclined plane 112.

In the illustrated example, a rod 114 is activated by an actuator 116 (e.g., a pneumatic actuator) that pushes a plate 118 to align the ends of the first and second profiles 107 so that the first and second profiles 107 are arranged near the duplex assembler 102. Upon detecting the arrival of a profile 107 using a magnetic sensor, for example, the rod 114 activated by the actuator 116 pushes the plate 118, which comes in contact with and pushes the end of the profile 107. At the end of the run, the rod 114 stops next to the profiles 107 and then retracts. As a result, the profile 107 is aligned with the packer (e.g., the duplex assembler 102 and/or bundle assembler 104). Given the size of the plate 118, more than one profile may be fitted (e.g., arranged, aligned) with the plate 118. In some examples, when the first profile 107 arrives, the first profile 107 is aligned, and when the second profile 107 arrives, both the first profile 107 and the second profile 107 are aligned to ensure that the ends of the first profile 107 and the second profile 107 are aligned.

Figure 2:
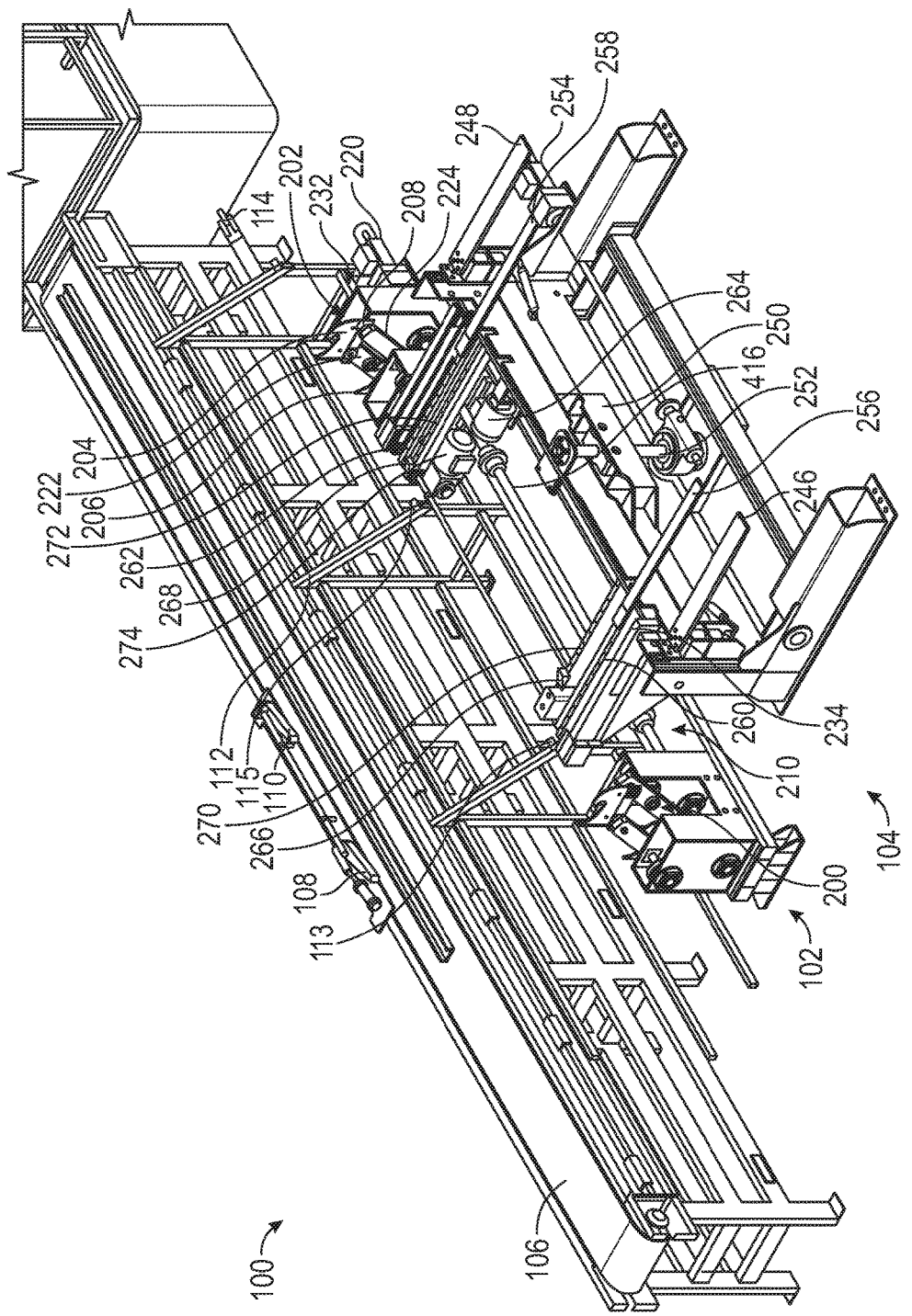
FIG. 2 illustrates another perspective view of the example automated packaging line of FIG. 1 without the U- or C-shaped profiles to expose the components of the example automated packaging line.
Figure 3:
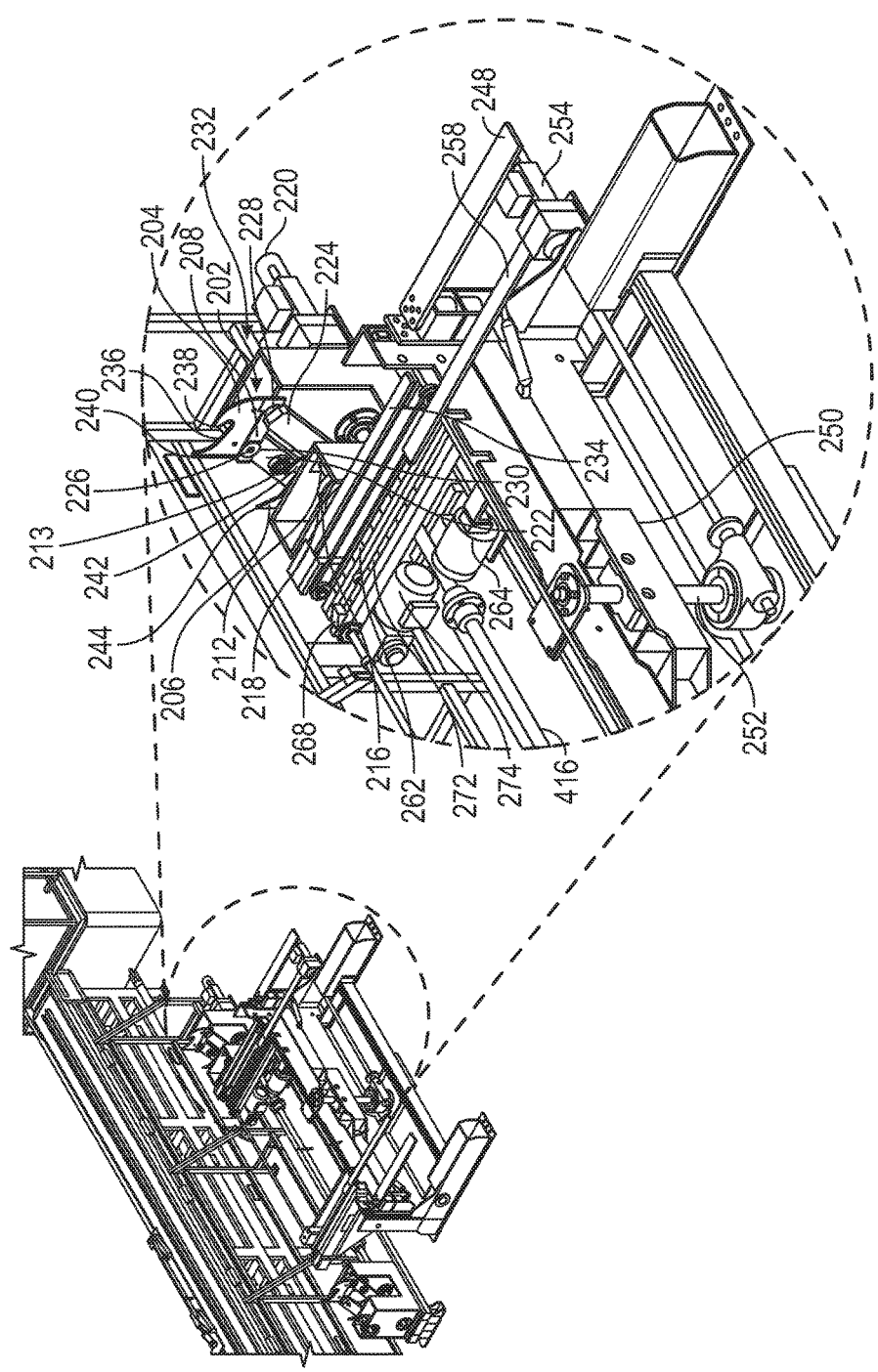
FIG. 3 illustrates an enlarged view of the area shown by circle A of the example duplex assembler and the example bundle assembler of FIG. 2.
Figure 4:
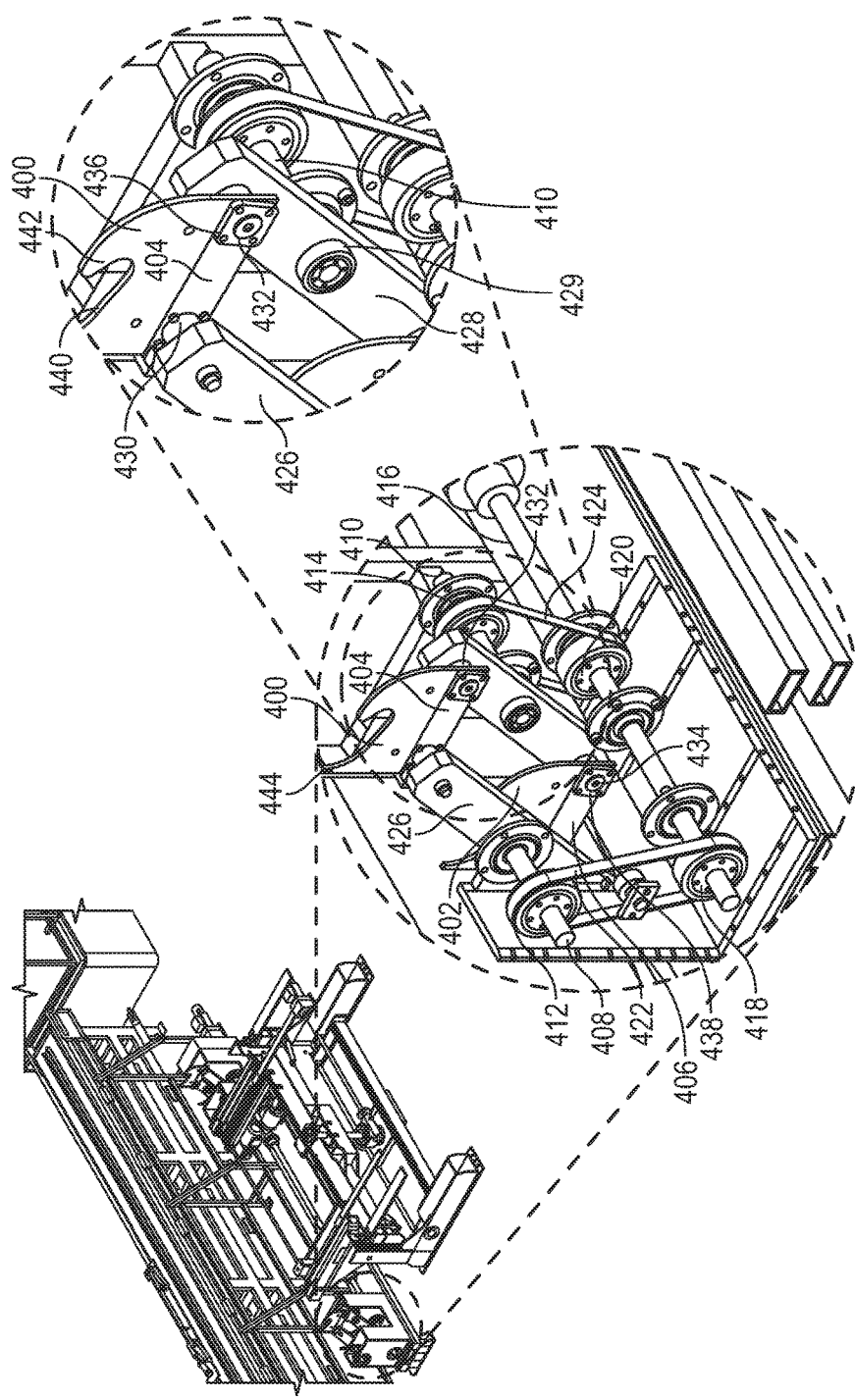
FIG. 4 illustrates enlarged views of the area shown by circle B (FIG. 3) of the example rotor arms and blades of the example duplex assembler of FIG. 2. Portions of the example duplex assembler have been removed to expose the components.

As illustrated in FIGS. 2 and 3, the duplex assembler 102 includes of two sets (e.g., pairs) of blades. Specifically, the duplex assembler 102 includes a first set of blades 200 and a second set of blades 202. Each of the sets of blades 200, 202 includes two blades. For example, as illustrated in FIG. 4, the first set of blades 200 includes a first blade 400 and a second blade 402. In the illustrated example, the first and second blades 400, 402 of the first set of blades 200 are coupled (e.g., attached) to first and second blade holders 404, 406, respectively. As illustrated in FIGS. 2 and 3, the second set of blades 202 are structurally similar to the first set of blades 200 described above. Specifically, the second set of blades 202 has a first blade 204 and a second blade 206 coupled to a respective first blade holder 208 and a second blade holder. The first set of blades 200 is located on one side of the lower end of the inclined plane 112 and the second set of blades 202 is located on the other side of the lower end of the inclined plane 112. In the illustrated example, each set of blades 200, 202 moves in a rotating motion where the blades 204, 206, 400, 402 are maintained in a horizontal position while the rotating motion takes place. The rotating motion is achieved through a blades rotor system 210 having two parallel axles for each set of blades 200, 202 located on each side of the lower end of the inclined plane 112. For example, as illustrated in FIG. 4, the blades rotor system 210 includes a first axle 408 and a second axle 410 that are parallel to each other. The first and second parallel axles 400, 402 of the first set of blades 200 are located along the same horizontal plane as each other and each of the first and second parallel axles 400, 402 has a dented pulley 412, 414, respectively, which transfers a rotating motion to the respective first and second parallel axles 408, 410. This motion is achieved via a principal axle 416 that has two dented pulleys 418, 420, through which the rotating motion is transferred using dented belts 422, 424 that connect the dented pulleys 418, 420 of the principal axle 416 to the dented pulleys 412, 414 of the first and second parallel axles 408, 410.

In the illustrated example, the second set of blades 202 (FIGS. 2 and 3) are structurally similar to the first set of blades 200 described above. Specifically, the second set of blades 202 also has a first axle 212 parallel to a second axle 213 and a first dented pulley 216 and a second dented pulley for the respective first and second parallel axles 212, 213. Dented pulleys are coupled to the principal axle 416 that correspond to the first dented pulley 216 and the second dented pulley. Rotating motion is transferred using a respective first dented belt 218 and a second dented belt that connect the dented pulleys of the principal axle 416 to the first dented pulley 216 and the second dented pulley of the respective first and second parallel axles 212, 213. In the illustrated example, on each side of the lower end of the inclined plane 112, each set of blades 200, 202 performs the same rotating motion generated by the principal axle 416. In other words, the principal axle 416 provides the rotating motion for both sets of blades 200, 202.

As illustrated in FIGS. 2 and 3, an actuator 220 generates the motion of the principal axle 416 that turns the dented pulleys of the principal axle 416 (e.g., the dented pulleys 418, 420 for the first set of blades 200 and the dented pulleys for the second set of blades 202). In this manner, the dented belts (e.g., the dented belts 422, 424 for the first set of blades 200 and the first dented belt 218 and the second dented belt of the second set of blades 202) transfer the motion to the respective first and second dented pulleys 412, 414 of the first set of blades 200 and the first dented pulley 216 and the second dented pulley of the second set of blades 202 connected to the respective first and second parallel axles 408, 410 of the first set of blades 200 and the respective first and second parallel axles 212, 213 of the second set of blades 202. Each of the blades 204, 206, 400, 402 is coupled to their corresponding holders (e.g., the first blade 400 and the corresponding first blade holder 404 of the first set of blades 200) and coupled to a frame through a bearing support and bearings that achieve the turning of the structure axle. For example, as illustrated in FIG. 4, the first and second parallel axles 408, 410 of the first set of blades 200 are coupled to a first rotor arm 426 and a second rotor arm 428, respectively, through flanges that are coupled (e.g., via screws) to the first and second parallel axles 408, 410. An example flange 429 between the second parallel axle 410 and the second rotor arm 428 is illustrated in FIG. 4. Likewise, as illustrated in FIGS. 2 and 3, the first and second parallel axles 212, 213 of the second set of blades 202 are coupled to a first rotor arm 222 and a second rotor arm 224, respectively, through flanges that are coupled (e.g., via screws) to the first and second parallel axles 212, 213.

In the illustrated example, the rotating motion of the principal axle 416 is transferred though the first and second dented pulleys 418, 420 to the respective first and second dented pulleys 412, 414 of the parallel axles 408, 410 of the first set of blades 200 via the respective dented belts 422, 424 that connect the respective dented pulleys. The rotating motion of the principal axle 416 is also transferred through the first and second dented pulleys (e.g., similar to the first and second pulleys 418, 420 but for the first set of blades 200) for the second set of blades 202 to the respective the first dented pulley 216 and the second dented pulley of the respective first and second parallel axles 212, 213 of the second set of blades 202 via the dented belts (e.g., the first dented belt 218 and a second dented belt) that connect the respective dented pulleys. This motion causes the first and second rotor arms 426, 428 of the first set of blades 200, which are coupled to the respective first and second parallel axles 408, 410 through the flange connection(s) to the first set of blades 200, to rotate. Likewise, this motion causes the first and second rotor arms 222, 224 of the second set of blades 202, which are coupled to the respective first and second parallel axles 212, 213 through the flange connection(s) to the second set of blades 202, to rotate.

In the illustrated example, on the side of the lower end of the inclined plane 112, the ends of the rotor arms 426, 428 are located on a first vertical plane that is diametrically opposed to the first and second parallel axles 408, 410 (e.g., the ends of the rotor arms 426, 428 are disposed radially outward from the first and second parallel axles 408, 410 in a direction that is perpendicular to the first and second parallel axles 408, 410) and move parallel to the ends of the other two rotor arms 222, 224 located on a second vertical plane parallel to the first vertical plane. The other rotor arms 222, 224 are also located on sides diametrically opposed to the first and second parallel axles 212, 213 on the side of the lower end of the inclined plane 112.

As illustrated in FIG. 4, each end of the rotor arms 426, 428 is coupled (e.g., attached) to a different end of the holders 404, 406 by a fixed axle. Specifically, one end of the first rotor arm 426 is coupled to the first blade holder 404 (e.g., at or near a first end of the first blade holder 404) via a first fixed axle 430 and the other end of the first rotor arm 426 is coupled to the second blade holder 406 (e.g., at or near a first end of the second blade holder 406) via a second fixed axle. Likewise, one end of the second rotor arm 428 is coupled to the first blade holder 404 (e.g., at or near a second end of the first blade holder 404) via a third fixed axle 432 and the other end of the second rotor 424 is coupled to the second blade holder 406 (e.g., at or near a second end of the second blade holder 406) via a fourth fixed axle 434. Therefore, when the first and second parallel axles 408, 410 turn, the first and third fixed axles 430, 432 located on the same side diametrically opposed to each of the first and second parallel axles 408, 410 move in a parallel direction that is always located on the same first horizontal plane. The same motion is made by the second fixed axle and the fourth fixed axle 434 located on the other side diametrically opposed to each of the first and second parallel axles 408, 410. The second fixed axle and the fourth fixed axle 434 also move in a parallel direction and that is always located on a second horizontal plane diametrically opposed to the first horizontal plane. In other words, the first and third fixed axles 430, 432 of the first blade holder 404 remain on the same horizontal plane (e.g., a first horizontal plane) as each other through the rotation of the first blade 400. Therefore, the first blade 400 remains in the same orientation throughout the rotation. Likewise, the second fixed axle and the fourth fixed axle 434 of the second blade holder 406 remain on the same horizontal plane (e.g., a second horizontal plane) as each other through the rotation of the second blade 402 and, therefore, the second blade 402 remains in the same orientation throughout the rotation.

As disclosed, on one side of the lower end of the inclined plane 112, the first fixed axle 430, the second fixed axle, the third fixed axle 432 and the fourth fixed axle 434 comprise the vertexes of the equivalent to an articulated parallelogram, which pivot center (e.g., a central axis around/about which the first and second blades 400, 402 rotate) is located in the middle two parallel sided of the mentioned parallelogram. Therefore, two of the fixed axles (e.g., the first fixed axle 430 and the third fixed axle 432) located on the same side, diametrically to the first and second parallel axles 408, 410 are located on a same first horizontal plane while the rotation of first and second parallel axles 408, 410 is performed. Likewise, the other two fixed axles (e.g., the second fixed axle and the fourth fixed axle 434) located on the other side, diametrically to the first and second parallel axles 408, 410, are located in a second horizontal plane diametrically opposed to the first horizontal plane.

In the illustrated example of FIG. 4, the first fixed axle 430, the second fixed axle, the third fixed axle 432 and the fourth fixed axle 434 are connected through bearings located at the lower ends of the respective blade holders 404, 406, and each lower end of each of the blade holders 404, 406 has bearing holders where the mentioned respective bearings are inserted. For example, in the illustrated example, one lower end of the first blade holder 404 has a first bearing holder, one lower end of the second blade holder 406 has a second bearing holder, the other lower end of the first blade holder 404 has a third bearing holder 436 and the other lower end of the second blade holder 406 has a fourth bearing holder 438. This allows the ends of the blade holders 404, 406 to rotate over the respective first fixed axle 430, second fixed axle, third fixed axle 432 and fourth fixed axle 434 keeping the blades 400, 402 in a substantially horizontal position (e.g., orientation, direction, alignment) when each lower end of each of the blade holders 404, 406 rotates around the first and second fixed parallel axles 408, 410.

In the illustrated example, the first set of blades 200, which includes the first and second blades 400, 402 located on diametrically opposed sides of the lower end of the inclined plane 112 and coupled (e.g., connected) to the ends of the rotor arms 426, 428 via the corresponding first fixed axle 430, second fixed axle, third fixed axle 432 and fourth fixed axle 434, move in a rotational motion around the first and second parallel axles 408, 410 on that side of the lower end of the inclined plane 112. During this motion, each of the blades 400, 402 remains substantially horizontal. Similarly, as illustrated in FIG. 3, on the other side of the lower end of the inclined plane 112, the second set of blades 202, which includes the first and second blades 204, 206 located on diametrically opposed sides and coupled to the ends of the rotor arms 222, 224 via a first fixed axle 226, second fixed axle, third fixed axle 228 and fourth fixed axle, move in a rotational motion, synchronized with the motion of the first and second blades 400, 402 of the first set of blades 200, around the first and second parallel axles 212, 213 located on the other side of the lower end of the inclined plane 112. Likewise, the first fixed axle 226, the second fixed axle, third fixed axle 228 and the fourth fixed axle of the second set of blades 202 are coupled through bearings located at their lower ends of the respective first blade holder 208 and the second blade holder, and each lower end of each of the first blade holder 208 and the second blade holder has bearing holders where the respective bearings are inserted. For example, in the illustrated example, one lower end of the first blade holder 208 has a first bearing holder 230, one lower end of the second blade holder has a second bearing holder, the other lower end of the first blade holder 208 has a third bearing holder and the other lower end of the second blade holder has a fourth bearing holder.

As illustrated in the example of FIG. 4, the distance (e.g., the spacing) between the first and second parallel axles 408, 410 is substantially the same as the distance between the centers of the first bearing holder and the third bearing holder 436 of the lower end of the first blade holder 404 and between the centers of the second bearing holder and the fourth bearing holder 438 of the lower end of the second blade holder 406. Likewise, as illustrated in FIGS. 2 and 3, the distance between the first parallel axle 212 and the second parallel axle 213 of the second set of blades 202 is substantially the same as the distance between the centers of the first bearing holder 230 and the third bearing holder of the lower end of the first blade holder 208 and the between the centers of the second bearing holder and the fourth bearing holder of the lower end of the second blade holder. The distance (e.g., the spacing) between the first and second rotor arms 426, 428 of the first set of blades 200 (e.g., on one side of the inclined plane 112) is approximately the same as the thickness of each of the blades holders 404, 406 to which the blades 400, 402 are coupled. Similarly, the distance (e.g., the spacing) between the first and second rotor arms 222, 224 of the second set of blades 202 (e.g., on the other side of the inclined plane 112) is approximately the same as the thickness of each of the first blade holder 208 and the second blade holder to which the respective first and second blades 204, 206 are coupled.

In an example operation, when the principal axle 416 rotates, the relative position of the two rotor arms 426, 428 on one side of the lower end of the inclined plane 112 is substantially the same as the relative position of the other two rotor arms 222, 224 on the other side of the lower end of the inclined plane 112. Therefore, the rotor arms 426, 428 located on one side of the lower end of the inclined plane 112 perform the same synchronized rotational motion as the other rotor arms 222, 224 located on the other side of the lower end of the inclined plane 112. In other words, the first rotor arm 426 of the first set of blades 200 and the first rotor arm 222 of the second set of blades 202 are in the same relative position as each other throughout the rotation, and the second rotor arm 428 of the first set of blades 200 and the second rotor arm 224 of the second set of blades 202 are in the same relative position as each other throughout the rotation.

Thus, for the first set of blades 200, each of the rotor arms 426, 428 is coupled (e.g., attached) to one of the ends of each of the blade holders 404, 406 and each end is connected to a different one of the rotor arms 426, 428. The turning or rotating of the rotor arms 426, 428 generates a circular motion on each of the blades 400, 402 with its rotational center or rotational axis (e.g., a central axis) located at a mid-distance between the first and second parallel axles 408, 410. The attachment of the two rotor arms 426, 428 over the lower end of the blade holders 404, 406 retains the blade holders 404, 406 at a horizontal position during the rotational motion. The second set of blades 202 operates in a similar manner.

In the illustrated example of FIG. 4, the first and second parallel axles 408, 410 of the first set of blades 200 are coupled to the rotor arms 426, 428, respectively, which are perpendicular to the first and second parallel axles 408, 410 and located on sides that are opposite to the diameters of the first and second parallel axles 408, 410. The ends of the rotor arms 426, 428 have the first fixed axle 430, the second fixed axle, the third fixed axle 432 and the fourth fixed axle 434 coupled to the ends of each of the blade holders 404, 406 through bearings that make each end of each of the blade holders 404, 406 rotate around the respective fixed axles such that each of the blade holders 404, 406 remains in a horizontal position when completing a rotation of each of the first and second parallel axles 408, 410 generated by the rotation of the principal axle 416. Similarly, as illustrated in FIGS. 2 and 3, the first and second parallel axles 212, 213 of the second set of blades 202 are coupled to the rotor arms 222, 224, respectively, which are perpendicular to the first and second parallel axles 212, 213 located on sides that are opposite to the diameters of the first and second parallel axles 212, 213. The ends of the rotor arms 222, 224 have the first fixed axle 226, the second fixed axle, third fixed axle 228 and the fourth fixed axle coupled to the respective ends of each of the first blade holder 208 and the second blade holder through bearings that make each end of each of the first blade holder 208 and the second blade holder rotate around the respective fixed axles such that each of the first blade holder 208 and the second blade holder remains in a horizontal position when completing a rotation of each of the first and second parallel axles 212, 213 generated by the rotation of the principal axle 416.

With the ends of two profiles 107 aligned, the duplex assembler 102 moves the principal axle 416 of a rotor 232 by means of the actuator 220, and its rotation is transferred to the rotor arms 222, 224, 426, 428 through the respective dented pulleys (e.g., the first and second dented pulleys 418, 420 of the principal axle 416 and the respective first and second dented pulleys 412, 414 of the first and second parallel axles 408, 410 for the first set of blades 200). The first and second blade holders 404, 406 of the first set of blades 200 and the first blade holder 208 and the second blade holder of the second set of blades 202 are coupled (e.g., connected) over the respective rotor arms 222, 224, 426, 428 (e.g., via fasteners, screws, etc.) and, over the blade holders, the blades 204, 206, 400, 402, of special shape, are coupled (e.g., attached) for each profile section. The rotation of the rotor arms 222, 224, 426, 428 enables the blades 204, 206, 400, 402 to perform a circular motion during which the blades 204, 206, 400, 402 take two profiles 107 from the lower end of the inclined plane 112 so as to oppose the internal concave sides of the two profiles 107 to assemble a duplex 120 (multiple duplexes 120 are illustrated in FIG. 1). The example duplex assembler 102 then places the duplex 120 over a frame 234 (FIGS. 2 and 3), which is located further up on the bundle assembler 104.

Figure 5:
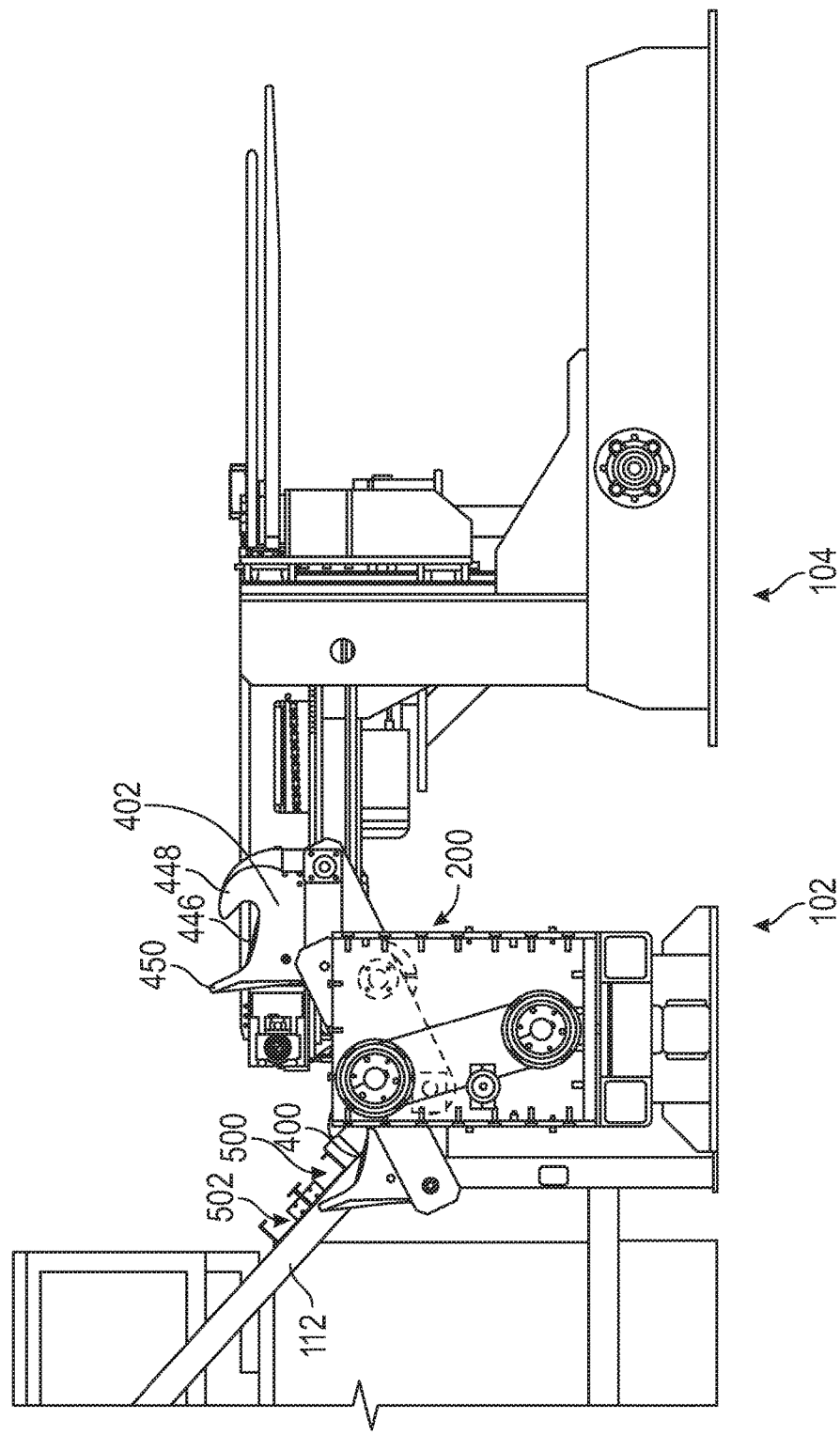
FIG. 5 illustrates a side view of the example duplex assembler of FIG. 4 and one of the example blades in position to receive profiles to form a duplex.

In the illustrated example, the four blades 204, 206, 400, 402 are implemented as rectangular-shaped (e.g., a rectangular-shaped first or lower portion) that may be made of, for example, alloyed steel, having upper sections that are machined. As illustrated in FIG. 4, for the first blade 400, the shape creates or forms a hollow or void area 440 (e.g., a notch, a cavity, a groove, etc.) with a first tip 442, which is an inverted tip (e.g., in the shape of a shark fin or a triangular shape with curved sides and rounded tip) and a second tip 444, which is a thin, narrow tip at end where the profiles are entered. The second blade 402 of the first set of blades 200 and the first and second blades 204, 206 of the first set of blades 202 have a similar structure as the first blade 400 of the first set of blades 200 described above. For example, as illustrated in FIGS. 4 and 5, the second blade 402 of the first set of blades 200 has a void area 446, a first tip 448, and a second tip 450. Likewise, as illustrated in FIG. 3, the first blade 204 of the second set of blades 202 has a void area 236, a first tip 238 and a second tip 240 and the second blade 206 of the first set of blades 202 has a void area, a first tip 242 and a second tip 244. Each of the lower ends of the blades 204, 206, 400, 402 is attached to the respective rotor arms 226, 228, 422, 424, as disclosed above. In some examples, the blades 204, 206, 400, 402 can be made out of other materials such as materials like high molecular weight polymers.

In the illustrated example, the rotational motion of the rotor arms 222, 224, 426, 428, coupled (e.g., attached) to the lower ends of the respective first and second blade holders 404, 406 of the first set of blades 200 and the first blade holder 208 and the second blade holder of the second set of blades 202, where the blades 204, 206, 400, 402 are inserted, enables the blades 204, 206, 400, 402 to perform a circular trajectory with a rotational center located between the first and second parallel axles 408, 410 of the first set of blades 200 and the first and second parallel axles 212, 213 of the second set of blades 202 (e.g., around a central axis that is horizontal and disposed between the first and second parallel axles 408, 410 of the first set of blades 200 and the first and second parallel axles 212, 213 of the second set of blades 202).

In the illustrated example, the circular trajectory motion of the blades 204, 206, 400, 402, moving upwards, passes through the inclined plane 112 and, in a lower position, the blades 204, 206, 400, 402 come in contact with two adjacent profiles to be made into a duplex. For example, during the trajectory, the first blade 400 of the first set of blades 200 and the first blade 204 of the second set of blades 202 take two profiles (as disclosed in further detail with respect to FIGS. 5-8). One profile (e.g., a first profile) is located at a position closer to the conveyor belt 106 (e.g., further up on the inclined plane 112) and the other profile (e.g., a second profile) is located at a position closer to the bundle assembler 104. The second tips 240, 444 of the first blades 204, 400 pushes and elevates the profile (e.g., the first profile) closest to the conveyor belt 106 by the convex side of the profile (e.g., the external face of the profile) from the position closest to the conveyor belt 106. Meanwhile the profile (e.g., the second profile) located at the lower end of the inclined plane 112, at the position closest to the bundle assembler 104, slides to the interior hollow area of the blades 204, 400. The second tips 240, 444 of the first blades 204, 400 continue elevating the upper end of the profile closest to the conveyor belt 106 while the lower end of the profile slides towards the interior hollow area of the blades 204, 400 at the lower end of the first tips 238, 442, where the other profile is located with the concave side (e.g., internal face, hollow side) facing upwards. By achieving the rotation (e.g., turning, flipping, inverting) one or the profiles (e.g., the first profile), this action opposes concave sides (e.g., the internal faces, the hollow sides) of the two profiles, thereby assembling a duplex. Therefore, in the illustrated example, the assembly of the duplex is achieved via a 180 degree rotation of the rotor arms 222, 224, 426, 428. Similarly, as the second blade 402 of the first set of blades 200 and the second blade 206 of the second set of blades 202 rotate through their trajectory, the second blades 206, 402 can receive two more profiles to likewise make another duplex.

Figure 6:
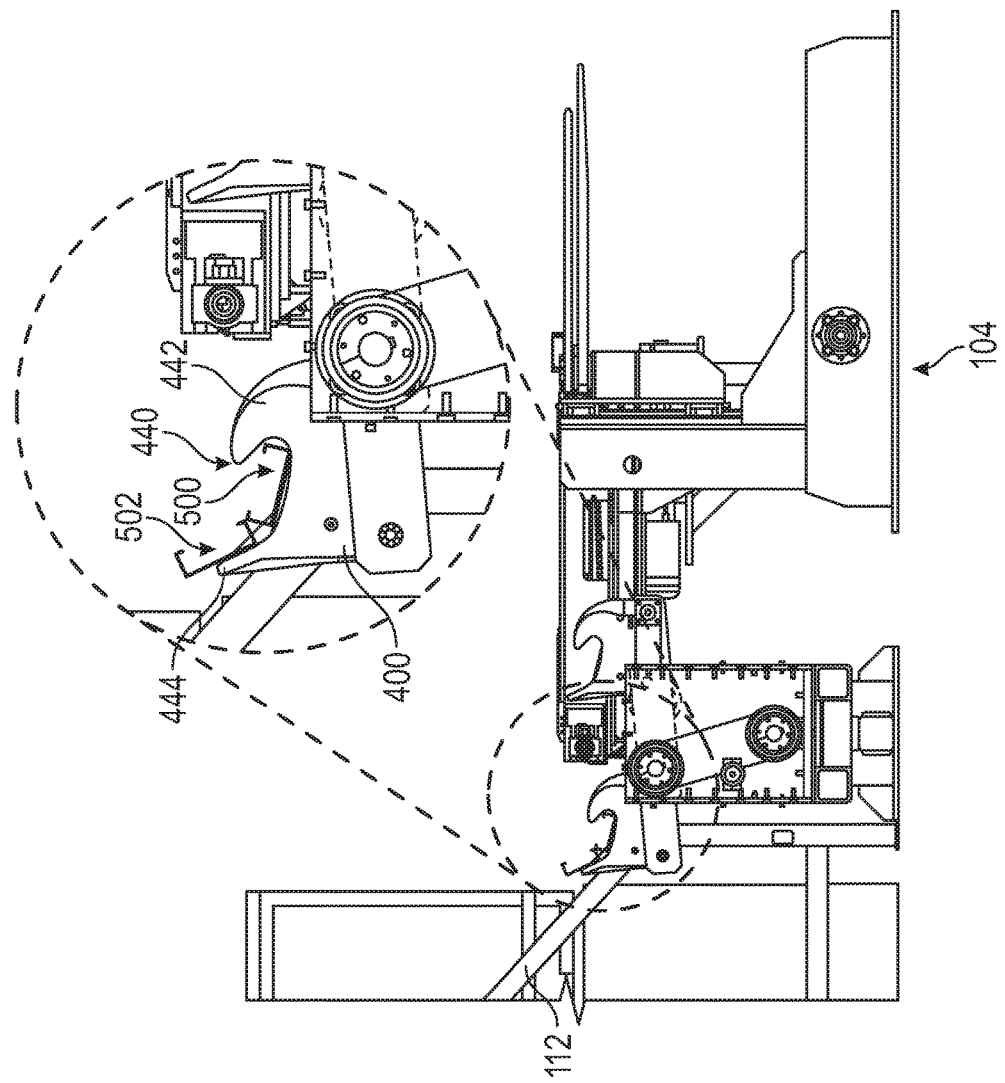
FIG. 6 illustrates an enlarged side view of the example blade of FIG. 5 receiving two profiles to form a duplex.
Figure 7:
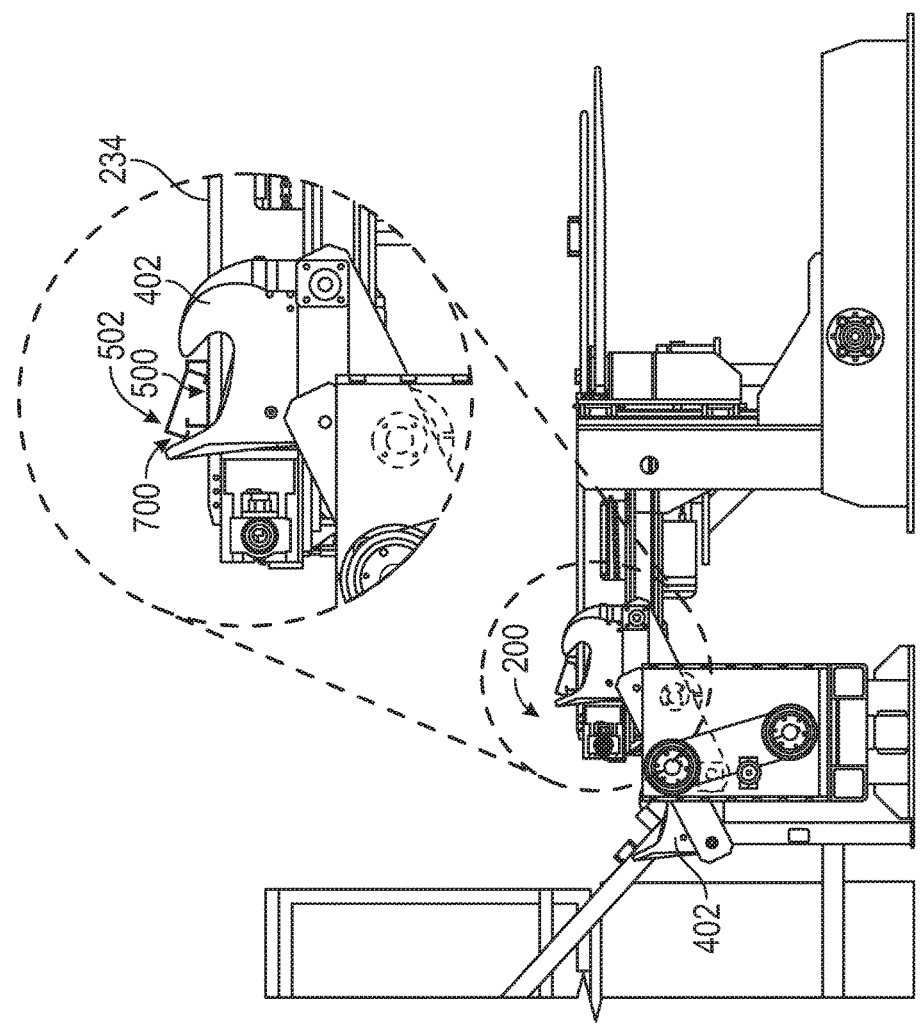
FIG. 7 illustrates an enlarged side view of the example blade of FIG. 5 assembling the duplex with the profiles and laying the duplex on an example table.

For example, FIGS. 5, 6 and 7 illustrate an example process of forming a duplex (e.g., the duplex 700 of FIG. 7) from a side view of the example duplex assembler 102. As illustrated in FIG. 5, the first blade 400 of the first set of blades 200 rotates upwards and passes through the inclined plane 112. The first blade 400 comes into contact with two adjacent profiles, a first profile 500 and a second profile 502, which are to be made into a duplex. In the illustrated example, the first profile 500 is located closer to the bundle assembler 104 and the second profile 502 is located closer to the conveyor 106 (e.g., the left side of the FIG. 5). As the first blade 400 moves upward, as illustrated in FIG. 6, the second tip 444 of the first blade 400 pushes and elevates the second profile 502 (e.g., the profile closest to the conveyor belt 106) by the convex side from the position closest to the conveyor belt 106. The first profile 500, which is located at the lower end of the inclined plane 112, at the position closest to the bundle assembler 104, slides into the interior hollow area 440 of the first blade 400. The second tip 444 of the first blade 400 continues elevating the upper end of the second profile 502 (e.g., the profile closest to the conveyor belt 106) while the lower end of the second profile 502 slides towards the interior hollow area 440 of the first blade 400 at the lower end of the first tip 442, where the first profile 500 is located. As illustrated in FIG. 7, the second profile 502 (e.g., the profile closest to the conveyor 106) flips or rotates over onto the first profile 500 to form a duplex 700. In this arrangement, the concave sides of the profiles 500, 502 face each other and form the duplex 700. As the first blade 400 continues to rotate, the duplex 700 is laid on the frame 234. Therefore, the duplex 700 is formed with 180 degree rotation of the first blade 400. As the first blade 400 is laying the duplex 700 on the frame 234, the second blade 402 of the first set of blades 200 can receive two more profiles to create another duplex. The first and second blades 204, 206 of the second set of blades 202 perform the same rotation in synchrony.

Once the duplex 700 is assembled, the duplex 700 proceeds to the bundle assembler 104, for example. In the illustrated example of FIGS. 2 and 3, the bundle assembler 104 includes the frame 234 and a first tilting claw 246 and a second tilting claw 248 with ascending and descending motion. The tilting claws 246, 248 are attached to a lowering cart 250, which maintains the parallel orientation of the tilting claws 246, 248 and transfers the motion through a lead screw 252 connected to a geared motor powered by an actuator 254.

In the illustrated example of FIGS. 2 and 3, the top of the bundle assembler 104 includes a first retractable claw 256 and a second retractable claw 258 that move in perpendicular motion relative to the conveyor belt 106 located at the cutter exit. The motion of the retractable claws 256, 258 is achieved through respective first and second roller chains 260, 262 driven by a motor 264 (e.g., a geared motor). Together with the retractable claws 256, 258 there are two pushing carts 266, 268, which motion is achieved through respective roller chains 270, 272 and a motor 274 (e.g., a gear motor). The motor 274 moves a pinion driving the roller chains 270, 272 attached to the pushing carts 266, 268.

In the illustrated example, when a duplex is over the frame 234, the two tilting claws 246, 248 and the two retractable claws 256, 258 are spread over the frame 234. When the duplex is disposed over the frame 234, the motor 274 activates and moves the roller chains 270, 272, which transmits this motion to the pushing carts 266, 268. On the top of each of the pushing carts 266, 268 there is a retractable trigger that allows a duplex to move over the triggers towards the claws 246, 248, 256, 258 and prevents the duplex from moving backwards. Through the triggers, the pushing carts 266, 268 move a duplex until placing the duplex over the retractable claws 256, 258.

Figure 8:
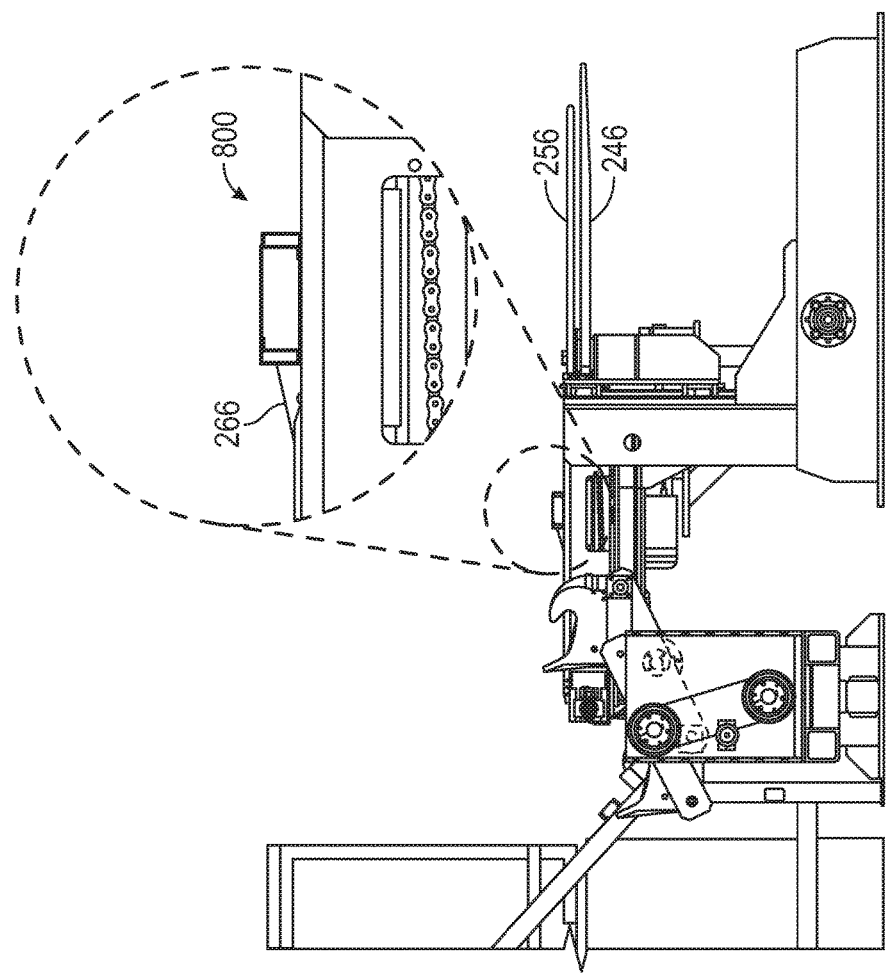
FIG. 8 illustrates an enlarged side view of an example push cart to transfer a duplex to example retractable claws and tilting claws of the example bundle assembler of FIG. 1.
Figure 9:
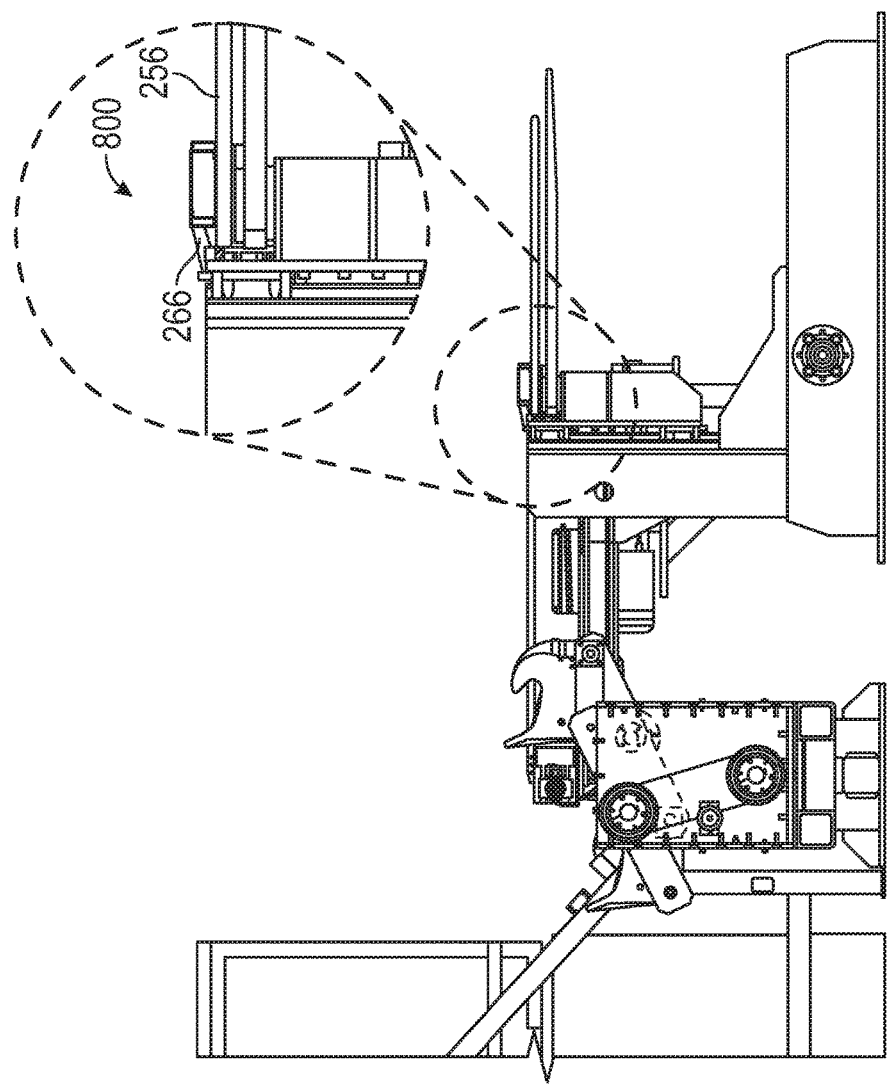
FIG. 9 illustrates an enlarged side view of the push cart of FIG. 8 moving a duplex onto the example retractable claws.

FIG. 8 illustrates a side view of the first pushing cart 266 pushing a duplex 800 toward the first retractable claw 256. In the illustrated example, the first tilting claw 246 is lower or beneath the first retractable claw 256 (the second retractable claw 258 being behind the first retractable claw 256 in this view). FIG. 9 illustrates a side view of the duplex 800 laid on the retractable claws 256, 258. When the duplex 800 lays over the retractable claws 256, 258, the geared motor 274 (FIG. 2) reverses the turning direction and makes the roller chains 270, 272 (FIG. 2) and the pushing carts 266, 268 move back to pick another duplex. In such an example, if there were another duplex over the frame 234 and the pushing carts 266, 268 were moving backwards, when the duplex comes in contact with the pushing carts 266, 268, the pushing carts 266, 268 retract their triggers and pass underneath the duplex until being positioned behind the duplex. Then the triggers extend to come in contact with the duplex, thereby initiating a new cycle in which the duplex is pushed to the retractable claws 256, 258 (FIG. 2) (e.g., as illustrated FIGS. 8 and 9).

When the pushing carts 266, 268 move the last duplex of a packaging line (e.g., a row of duplexes in a bundle), the motor 274 retains the pushing carts 266, 268 in their positions while the motor 264 activates, thereby moving the roller chains 260, 262 and making the retractable claws 256, 258 move backwards. If the duplexes positioned over the retractable claws 256, 258 were to move backwards, the triggers of the pushing carts 266, 268 would prevent such movement. When the retractable claws 256, 258 retract (e.g., move backwards), the duplexes that form the row in the bundle are positioned over the tilting claws 246, 248.

Figure 10:
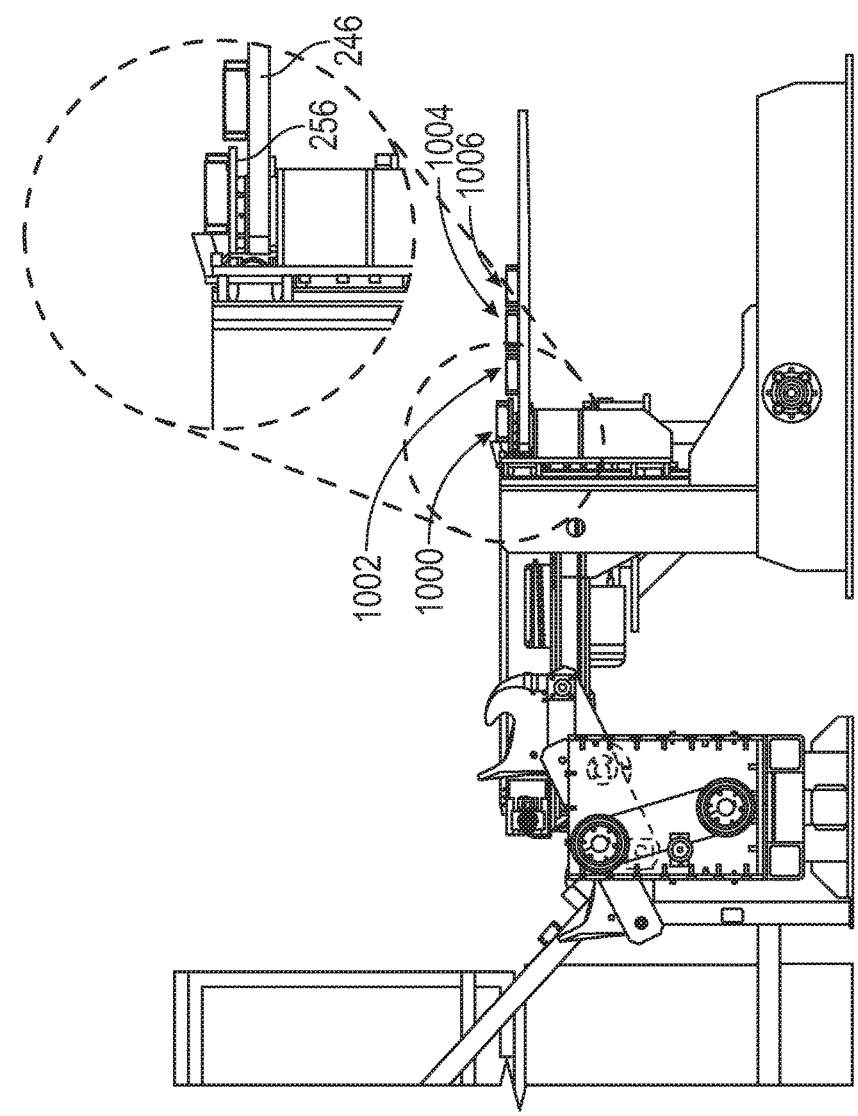
FIG. 10 illustrates an enlarged side view of the example retractable claws of FIG. 8 retracting to place duplexes on the example tilting claws.

FIG. 10 illustrates an example of the first retractable claw 256 and the second retractable claw 258 (see FIG. 2) retracting (e.g., moving backwards) and while four duplexes 1000, 1002, 1004, 1006 are positioned on the first tilting claw 246 and the second tilting claw 248 (FIG. 2) to form a row of duplexes. When the retractable claws 256, 258 reach the end of their trajectory, the retractable claws 256, 258 stop and the actuator 254 (FIG. 2) that moves the lead screw 252 (FIG. 2) activates. The lowering cart 250 (FIG. 2) and the tilting claws 246, 248 then lower (e.g., descend).

In the illustrated example, the actuator 254 stops when the tilting claws 246, 248 together with the duplexes 1000-1006 are below the retractable claws 256, 258, in order to wait for the second row of duplexes. Then, the motor 264 that moves the roller chains 260, 262 activates, for example, to extend (e.g., deploy) the retractable claws 256, 258 and place the retractable claws 256, 258 above the former row of duplexes 1000-1006. Once the retractable claws 256, 258 are extended, the motor 274 is activated again to move the pushing carts 266, 268 to retrieve the duplexes that form the second row, thereby repeating the cycle.

Figure 11:
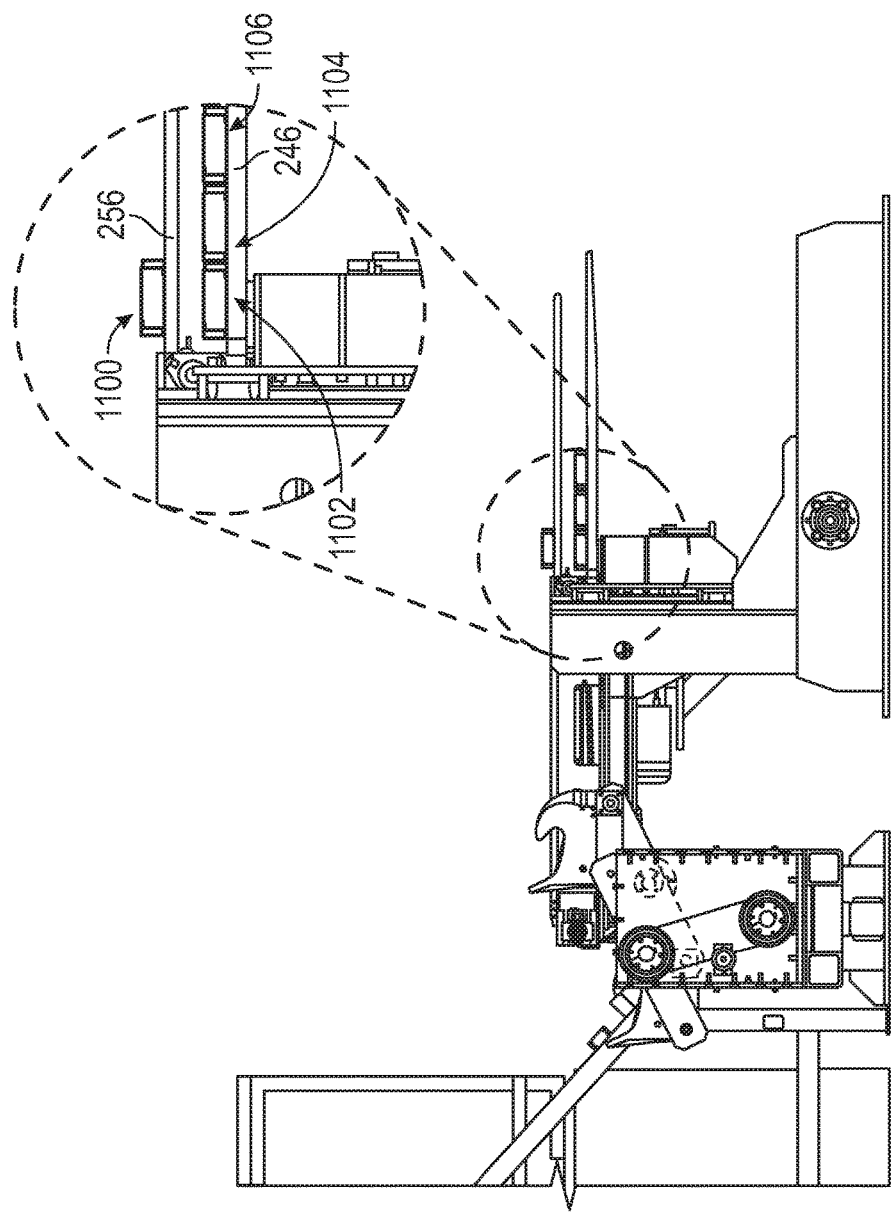
FIG. 11 illustrates an enlarged side view of the example tilting claws of FIG. 10 in a lowered position and the example push cart in position to receive another duplex.

FIG. 11 illustrates an example of the first retractable claw 256 and the second retractable claw 258 (FIG. 2) re-extended, and another duplex 1100 is positioned on the retractable claws 256, 258 over a first row of duplexes 1102, 1004, 1106 that are supported on the first tilting claw 246 and the second tilting claw 248 (FIG. 2). A perspective view of this arrangement is illustrated in FIG. 1, for example.

Once the number of rows and columns that form the bundle is completed, the retractable claws 256, 258 move backwards and the tilting claws 246, 248 move downwards until the tilting claws 246, 248 lay the bundles over an exit table, where the bundle is strapped and transported for storage.

In some examples, the automation of the example processes carried out by the example automated packaging line 100 for profiles with a U-shaped or C-shaped section, as disclosed herein, employs one or more Logic Programmable Controllers (LPCs) with corresponding programming to improve the continuous line production timeframes. The LPC(s) may control, for example, the conveyor belt 106, the pivoting kickers 108, 110, the actuator 220 that generates the principal axle 416 motion, the retractable claws 256, 258, the tilting claws set 246, 248 and the pushing carts 266, 268 as well as the motor 274, the motor 264 that moves the roller chains 260, 262, the motor 254 that moves the lead screw 252 and other electro-mechanical components of the automated packaging line 100 for profiles or molds with a U- or a C-shaped section.

The example automated packaging line disclosed herein uses rotation of the example blades to advantageously place two profiles forming a duplex in front of each other and lay the duplex over a table, which enables the automated packaging line to vary the amount of duplexes forming a base of a bundle. The opposition of two profiles is achieved through the geometrical shape of the blades. Additionally, in some examples, the automated packaging line does not require mechanical or magnetic holding of a profile to rotate or oppose the profiles, as required by other known lines. As a result, the example automated packaging line can be used for a relatively wider range of materials, and not just steel profiles as required in other known lines that use magnets. The example automated packaging line is also modular such that the automated packaging line can be added to other equipment, which allows the creation of duplexes with different profile lengths.

Unlike other known lines, where the speeding up of a rotating arm may expel a profile without assembling a duplex, the work speed of the example automated packaging line is unlimited. Additionally, the automated packaging line is more efficient because automated packing line can assemble two duplexes with one rotation of the blades, as compared to other known lines that can only assemble one duplex at a time. As a result, the example automated packaging line has a high packaging speed. Also, unlike other known lines that use connecting rod and piston motions generated by an air engine, for example, the assembly of a duplex in the example automated packaging line is achieved through one-way rotating circular motions produced by electric engines. Further, the motions of the example automated packaging line disclosed herein are less complex because motions include rotation of one of the blades to assemble a pair of profiles or duplex. As a result, the example automated packaging line employs less parts or components, which decreases the amount and costs of manufacture and maintenance.

What is claimed is:

1. A method comprising:
    transferring a first profile and a second profile to a first location, each of the first and second profiles having a u-shaped or c-shaped cross-section defining an external convex side and an internal concave side;
    rotating a first blade and a second blade about a horizontal axis, the first blade and the second blade coupled to opposite ends of a pair of rotor arms including a first rotor arm and a second rotor arm;
    inserting the first profile into the first blade with the internal concave side of the first profile facing upwards as the first blade moves upward through its rotation;
    rotating the second profile by engaging the first blade with the external convex side of the second profile to position the second profile with the internal concave side of the second profile facing downwards over of the internal concave side of the first profile to form a first duplex within the first blade; and
    forming a second duplex with the second blade, wherein the first duplex and the second duplex are to be formed in one full rotation of the first and second blades about the horizontal axis.

2. The method of claim 1 further including transferring the first duplex to a second location to be packaged.

3. The method of claim 1 further including:
    transferring a third profile and a fourth profile to the first location, each of the third and fourth profiles having a u-shaped or c-shaped cross-section defining an external convex side and an internal concave side;
    inserting the third profile into the second blade with the internal concave side of the third profile facing upwards as the second blade moves upward through its rotation; and
    rotating the fourth profile by engaging the second blade with the external convex side of the fourth profile to position the fourth profile with the internal concave side of the fourth profile facing downwards over of the internal concave side of the third profile to form the second duplex within the second blade.

4. The method of claim 1, wherein transferring the first and second profiles includes sliding the first and second profiles down an inclined plane to the first location.

5. The method of claim 1 further including maintaining the first and second blades substantially horizontal as the first and second blades rotate around the horizontal axis.

6. The method of claim 1, wherein rotating the first and second blades about the horizontal axis includes rotating the first rotor arm and the second rotor arm, the first rotor arm having a first end rotatably coupled to the first blade and a second end rotatably coupled to the second blade, the second rotor arm having a third end rotatably coupled to the first blade and a fourth end rotatably coupled to the second blade.

7. The method of claim 1, wherein the first blade is disposed substantially 180 degrees (°) opposite the second blade relative to the horizontal axis.

8. A method comprising:
    transferring a first profile and a second profile to a first location, each of the first and second profiles having a u-shaped or c-shaped cross-section defining an external convex side and an internal concave side;
    rotating a first blade and a second blade about a horizontal axis, the first blade and the second blade coupled to opposite ends of a pair of rotor arms including a first rotor arm and a second rotor arm;
    rotating a third blade and a fourth blade about the horizontal axis; and
    inserting the first profile into the first blade with the internal concave side of the first profile facing upwards as the first blade moves upward through its rotation;
    inserting the first profile into the third blade while inserting the first profile into the first blade; and
    rotating the second profile by engaging the first blade with the external convex side of the second profile to position the second profile with the internal concave side of the second profile facing downwards over of the internal concave side of the first profile to form a first duplex within the first blade.

9. The method of claim 8, wherein, when the first, second, third and fourth blades rotate about the horizontal axis, the first blade and the third blade remain along a same horizontal plane as each other and the second blade and the fourth blade remain along a same horizontal plane as each other.

10. The method of claim 8, wherein the first and second blades are rotatable about the horizontal axis in a first vertical plane, and the third and fourth blades are rotatable about the horizontal axis in a second vertical plane that is parallel to and offset from the first vertical plane.

11. The method of claim 8, wherein the pair of rotor arms is a first pair of rotor arms, and wherein the third blade and the fourth blade are coupled to opposite ends of a second pair of rotor arms.

12. A method comprising:
    transferring a first profile and a second profile to a first location, each of the first and second profiles having a u-shaped or c-shaped cross-section defining an external convex side and an internal concave side;

rotating a first blade and a second blade about a horizontal axis, the first blade and the second blade coupled to opposite ends of a pair of rotor arms including a first rotor arm and a second rotor arm, wherein rotating the first blade and the second blade includes rotating the first rotor arm and the second rotor arm;

inserting the first profile into the first blade with the internal concave side of the first profile facing upwards as the first blade moves upward through its rotation; and rotating the second profile by engaging the first blade with the external convex side of the second profile to position the second profile with the internal concave side of the second profile facing downwards over of the internal concave side of the first profile to form a first duplex within the first blade.

13. The method of claim 12, wherein a first axle is coupled to the first rotor arm and a second axle is coupled to the second rotor arm, and wherein rotating the first and second rotor arms includes rotating the first and second axles.

14. The method of claim 13, wherein the first axle is perpendicular to the first rotor arm and the second axle is perpendicular to the second rotor arm.

15. The method of claim 13, wherein the first and second axles are parallel to each other and disposed along a same horizontal plane.

16. The method of claim 13, wherein the first axle and the second axle are coupled to a third axle, and wherein rotating the first and second axles includes rotating the third axle.

17. The method of claim 16, wherein the first axle is coupled to the third axle via a first belt and the second axle is coupled to the third axle via a second belt.

* * * * *